United States Patent
Eguchi et al.

[11] Patent Number: 5,218,606
[45] Date of Patent: Jun. 8, 1993

[54] CURRENT-SPARE SWITCHING CONTROL SYSTEM

[75] Inventors: Yoshitaka Eguchi, Fukuoka; Junichi Yoshimura, Kawasaki, both of Japan

[73] Assignee: Fujitsu Limited, Kanagawa, Japan

[21] Appl. No.: 778,544

[22] Filed: Oct. 18, 1991

[30] Foreign Application Priority Data

Oct. 20, 1990 [JP] Japan .................................. 2-283044

[51] Int. Cl.$^5$ ............................................. G06F 11/00
[52] U.S. Cl. ...................................... 371/9.1; 395/575; 364/285; 371/68.3; 371/25.1
[58] Field of Search ............... 371/9.1, 25.1, 68.1, 371/68.3; 395/575; 364/285, 268, 268.3, 268.9

[56] References Cited

U.S. PATENT DOCUMENTS

| | | | |
|---|---|---|---|
| 3,876,987 | 4/1975 | Dalton et al. | 340/172.5 |
| 4,628,508 | 12/1986 | Sager et al. | 371/9.1 |
| 4,823,256 | 4/1989 | Bishop et al. | 371/9.1 |
| 4,849,939 | 7/1989 | Muranaka et al. | 365/200 |

FOREIGN PATENT DOCUMENTS 2611401 2/1987 France .
63-298888 12/1988 Japan .

OTHER PUBLICATIONS

European Search Report dated Nov. 19, 1992.

*Primary Examiner*—Robert W. Beausoliel, Jr.
*Assistant Examiner*—Phung My Chung
*Attorney, Agent, or Firm*—Nikaido, Marmelstein, Murray & Oram

[57] ABSTRACT

In a current-spare switching control system provided for a data processing system having a current data processor, a spare data processor, a fault supervisor for supervising the fault of these processors, and switching units for switching from the current data processor to the spare data processor or vice versa, the current-spare switching control system includes: a storage unit for temporarily storing data bits from the fault supervisor; a discrimination unit operatively connected to the storage unit and for comparing the data bits with a reference signal and outputting a coincidence signal when the data bits coincides with the reference signal; an AND gate operatively connected to the discrimination unit for inputting the coincidence signal and a write command from the fault supervisor, and outputting a write signal when the coincidence signal coincides with the write command; a register unit operatively connected to the AND gate for inputting a data bit from the fault supervisor and outputting a switching signal to switch from the current data processor to the spare data processor or vice versa.

6 Claims, 5 Drawing Sheets

CURRENT-SPARE SWITCHING CONTROL SYSTEM

BACKGROUND OF THE INVENTION

1. Field of the Invention

The present invention relates to a current-spare switching control system, more particularly, it relates to a current-spare switching control system provided for a data processing system having a current data processor, a spare data processor, a fault supervisor for supervising the fault of these processors, and switching units for switching from the current data processor to the spare data processor or vice versa.

2. Description of the Related Art

In general, a data processing system has a current data processor and a spare data processor to ensure the reliability of data processing. The current data processor usually runs in a normal state, but it is immediately switched to the spare data processor when the fault occurs in the current data processor. In this case, the fault is detected by a fault supervisor which generates a switching signal to switch the switching units.

The fault supervisor usually has an internal microprocessor for supervising the fault of these processors and generating the switching signal to switch the switching units. The switching units, however, accidentally operate in error due to an error signal caused by reckless operation of the internal microprocessor of the fault supervisor. Accordingly, it is necessary to ensure correct operation of the switching units.

SUMMARY OF THE INVENTION

The object of the present invention is to provide a current-spare switching control system enabling correct operation of switching units for switching from the current data processor to the spare data processor or vice versa.

In accordance with the present invention, there is provided a current-spare switching control system provided for a data processing system having a current data processor, a spare data processor, a fault supervisor for supervising the fault of these processors, and switching units for switching from the current data processor to the spare data processor or vice versa.

In one aspect of the present invention, the above current-spare switching control system includes:

a storage unit for temporarily storing data bits from the fault supervisor;

a discrimination unit operatively connected to the storage unit for comparing the data bits with a reference signal and outputting a coincidence signal when the data bits coincide with the reference signal;

an AND gate operatively connected to the discrimination unit and for inputting the coincidence signal and a write command from the fault supervisor, and outputting a write signal when the coincidence signal coincides with the write command;

a register unit operatively connected to the AND gate for inputting a data bit from the fault supervisor and outputting a switching signal to switch from the current data processor to the spare data processor or vice versa.

In the preferred embodiment, the storage unit has D-type flip-flop circuits each corresponding to each of data bits and inputting a write command from the fault supervisor; and the register unit has a D-type flip-flop circuit for inputting the data bit from the fault supervisor and the write signal from the AND gate, and outputting the switching signal.

In the preferred embodiment, the current-spare switching control system further includes a leading edge detection circuit operatively connected to the D-type flip-flop circuit and the AND gate for inputting the write signal from the AND gate, detecting a leading edge of the write signal, and outputting a reset signal to the flip-flop circuits to clear the data bits therein.

In another aspect of the present invention, the current-spare switching control system includes:

a shift register for sequentially inputting data bits from the fault supervisor and outputting data bits parallel therefrom in response to a shift command from the fault supervisor;

a discrimination unit operatively connected to the shift register unit for comparing the data bits with a reference signal and outputting a coincidence signal when the data bits coincide with the reference signal; and a register operatively connected to the discrimination unit for outputting a switching signal to switch from the current data processor to the spare data processor or vice versa.

In the preferred embodiment, the shift register has D-type flip-flop circuits, a first flip-flop circuit sequentially inputting data bits, and each flip-flop circuit outputting data bits in parallel in response to the shift command; and discrimination unit has a decoder for decoding data bits to produce the switching signal.

In still another aspect of the present invention, there is provided a method for generating a current-spare switching signal for switching from the current data processor to the spare data processor or vice versa.

The method includes the steps of:

temporarily storing data bits from the fault supervisor;

comparing the data bits with a reference signal and outputting a coincidence signal when the data bits coincide with the reference signal;

generating a write signal when the coincidence signal coincides with a write command from the fault supervisor; and outputting a current-spare switching signal to switch from the current data processor to the spare data processor or vice versa, based on the data bit from the fault supervisor.

DESCRIPTION OF THE PREFERRED EMBODIMENTS

Figure 1:
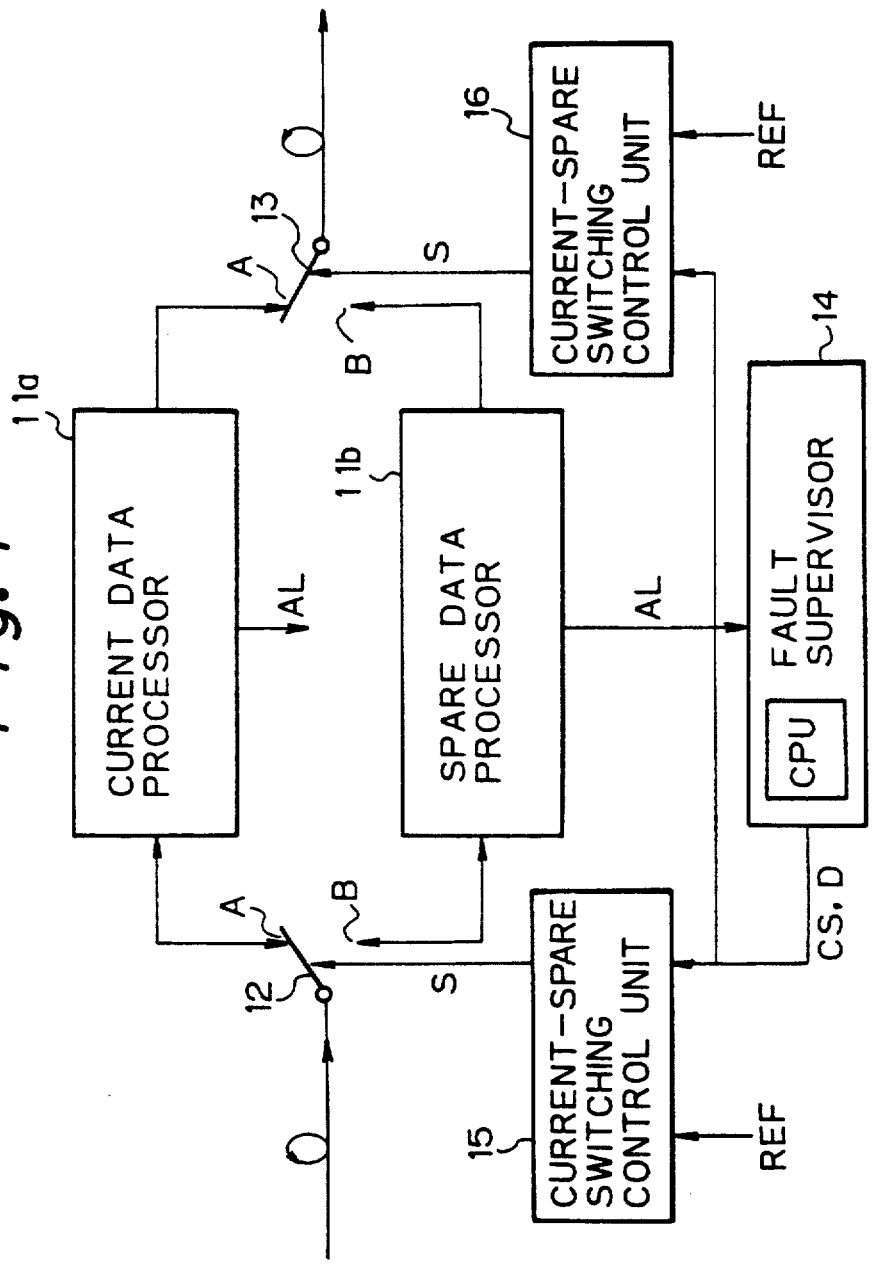
FIG. 1 is a schematic block diagram of a data processing system applying the present invention.

FIG. 1 is a schematic block diagram of a data processing system applying the present invention. In FIG. 1, 11a denotes a current data processor and 11b denotes a spare processor. 12 and 13 denote switching units for switching from the current data processor 11a to the spare data processor 11b or vice versa. 14 denotes a fault supervisor. 15 and 16 denote current-spare switching control units each generating a switching signal S to switch the switching units 12 and 13. Further, AL denotes an alarm signal generated from the current data processor 11a and the spare data processor 11b when the fault occurs in these processors, and REF denotes a reference signal generated from a host computer (not shown).

The fault supervisor 14 has an internal microprocessor CPU and generates a command CS and data D from the internal microprocessor CPU to the current-spare switching control units 15 and 16 when the alarm signal AL is input from the current data processor 11a or the spare data processor 11b. Each of the current-spare switching control units 15 and 16 generates the switching signal S for simultaneously switching from the contact A to the contact B or vice versa in the switching units 12 and 13 when receiving the command CS, the data D and the reference signal REF, as explained in detail below.

Figure 2:
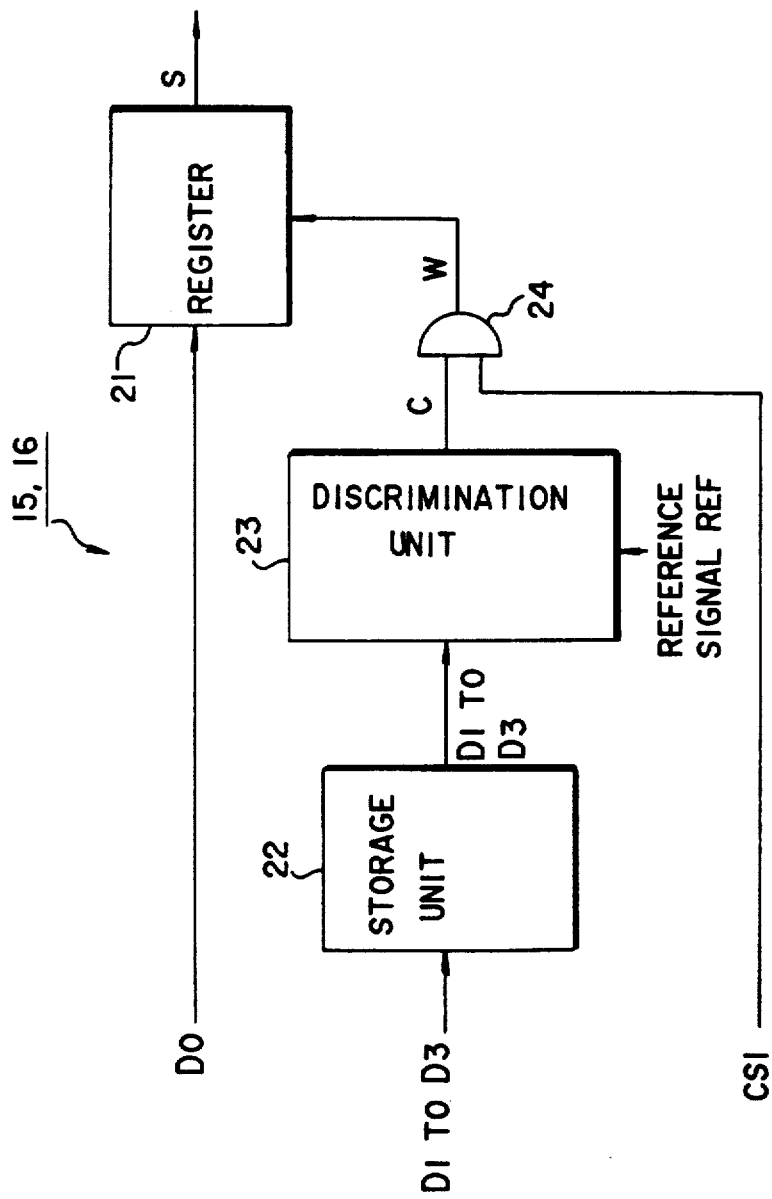
FIG. 2 is a basic block diagram of the current-spare switching control unit according to an embodiment of the present invention.

FIG. 2 is a basic block diagram of the current-spare switching control unit according to an embodiment of the present invention. In FIG. 2, 21 denotes a register, 22 denotes a storage unit, and 23 denotes a discrimination unit.

A write command CS1, a bit $D_0$, and bits $D_1$ to $D_3$ are input from the internal microprocessor CPU of the fault supervisor 14 of FIG. 1. As shown in the drawing, the bit $D_0$ is input to the register 21, the bits $D_1$ to $D_3$ are input to the storage unit 22, and the write command CS1 is input to an AND gate 24. The storage unit 22 temporarily stores the bits $D_1$ to $D_3$. The discrimination unit 23 compares the bits $D_1$ to $D_3$ with the reference signal REF and outputs a coincidence signal C when the bits $D_1$ to $D_3$ coincide with the reference signal REF. Accordingly, when the write command CS1 is input to the AND gate 24, the AND gate 24 outputs a write signal W to the register 21 so that the bit $D_0$ is written into the register 21. As a result, the register 21 outputs the switching signal S to the switching units 12 and 13.

Figure 3:
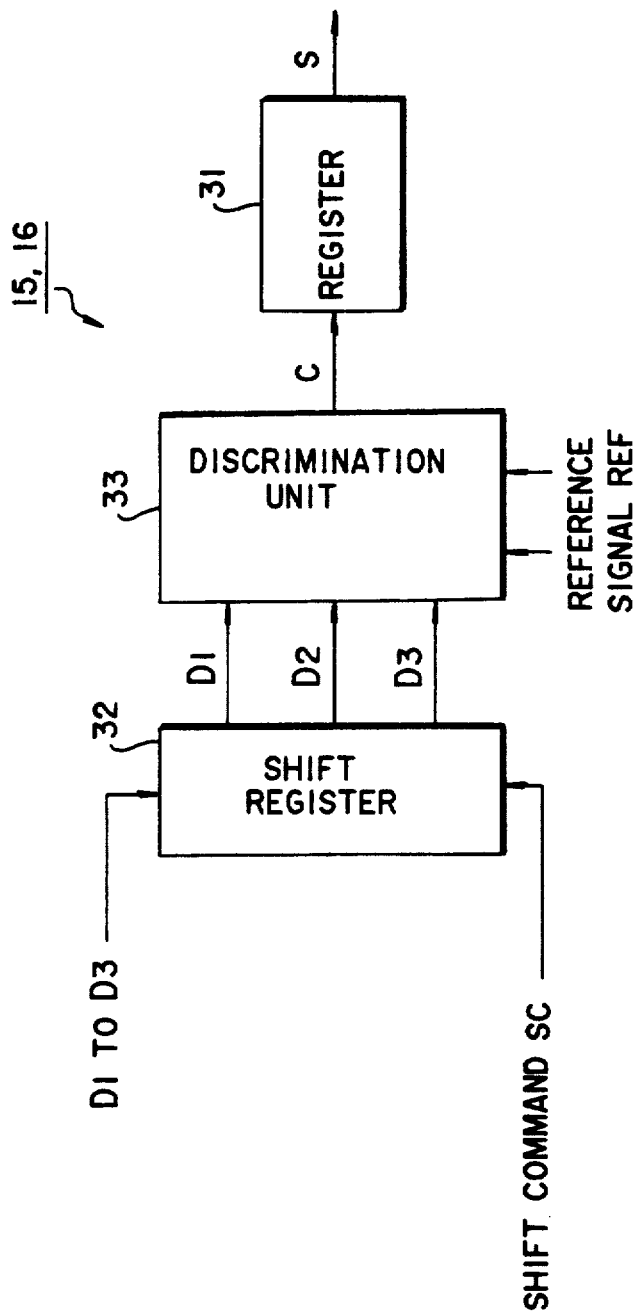
FIG. 3 is a basic block diagram of the current-spare switching control unit according to another embodiment of the present invention.

FIG. 3 is a basic block diagram of the current-spare switching control unit according to another embodiment of the present invention. In FIG. 3, 31 denotes a register, 32 denotes a shift register, and 33 denotes a discrimination unit. The internal microprocessor CPU of the fault supervisor 14 generates a shift command SC and bits $D_1$ to $D_3$. The bits $D_1$ to $D_3$ are sequentially input to the shift register 32 in response to the shift command SC from the fault supervisor 14. The bits $D_1$ to $D_3$ are input in parallel to the discrimination unit 33 to compare the bits $D_1$ to $D_3$ with the reference signal REF. The discrimination unit 33 outputs the coincidence signal C when the bits $D_1$ to $D_3$ coincide with the reference signal REF. As a result, the register 31 outputs the switching signal S to the switching unit 12 and 13.

Figure 4:
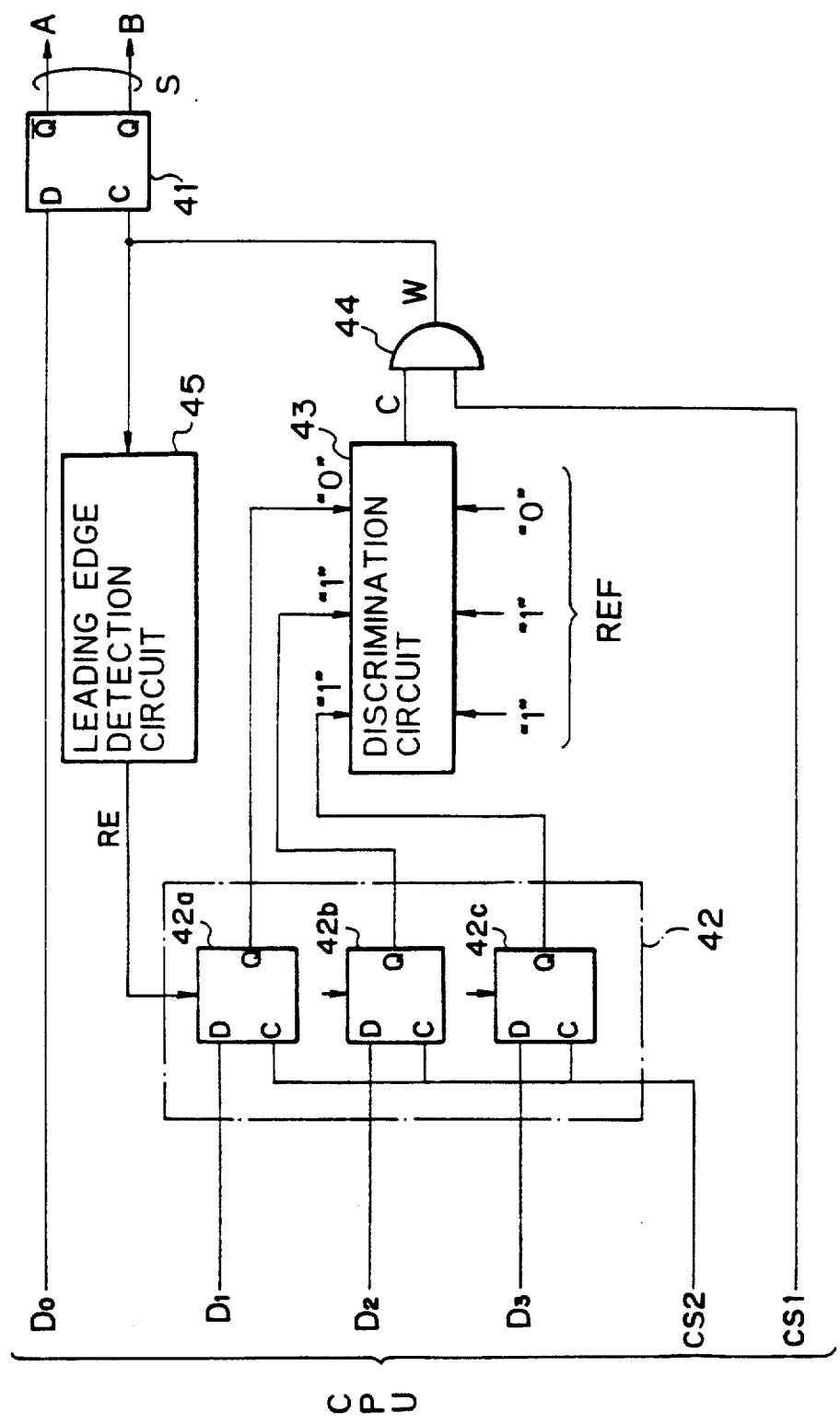
FIG. 4 is a detail circuit of the current-spare switching control unit shown in FIG. 2.

FIG. 4 is a detail circuit of the current-spare switching control unit shown in FIG. 2. In FIG. 4, 41 denotes a D-type flip-flop circuit corresponding to the register 21 of FIG. 2, 42 denotes a memory circuit corresponding to the storage unit 22 of FIG. 2, 43 denotes a discrimination circuit corresponding to the discrimination unit 23 of FIG. 2, 44 denotes an AND gate corresponding to the AND gate 22 of FIG. 2, and 45 denotes a leading edge detection circuit. The memory circuit 42 is constituted by, for example, flip-flop circuits 42a to 42c each corresponding to one bit.

As explained above, the write commands CS1 and CS2, the bit $D_0$, and the bits $D_1$ to $D_3$ are input from the internal microprocessor CPU of the fault supervisor 14 of FIG. 1. When the write command CS2 is input to the terminal C of the flip-flop circuits 42a to 42c, the bits $D_1$ to $D_3$ are input to the terminal D of the flip-flop circuits 42a to 42c and output the bits $D_1$ to $D_3$ from the terminal Q to the discrimination circuit 43. The discrimination circuit 43 compares the bits $D_1$ to $D_3$ with the reference signal REF and outputs a coincidence signal C when the bits $D_1$ to $D_3$ coincides with the reference signal REF. In this case, the discrimination circuit 43 may be constituted by, for example, exclusive OR circuits (not shown) each corresponding to one bit. That is, for example, bits "1 1 0" are input to the discrimination circuit 43 as the reference signal REF, and bits "1 1 0" are input to the circuit 43 as the bits $D_1$ to $D_3$. The circuit 43 outputs a coincidence signal C when the bits $D_1$ to $D_3$ coincide with the reference signal REF Accordingly, when the write command CS1 is input to the AND gate 44, the AND gate 44 outputs the write signal W to the flip-flop circuit 41 so that the bit $D_0$ is written into the flip-flop circuit 41. As a result, the flip-flop circuit 41 outputs the switching signal S to the switching unit 12 and 13.

Further, the write signal W is input to the leading edge detection circuit 45. When the leading edge detection circuit 45 detects a leading edge of the write signal W, it generates a reset signal RE to the flip-flop circuits 42a to 42c to clear the memory 42.

Figure 5:
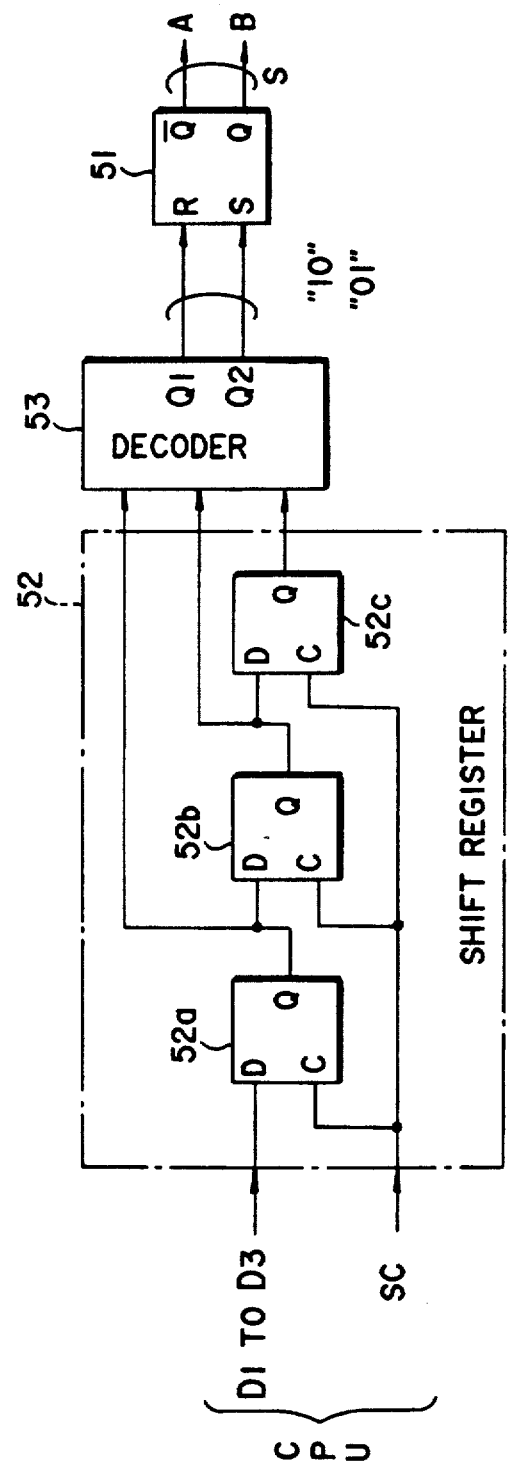
FIG. 5 is a detailed circuit of the current-spare switching control unit shown in FIG. 3.

FIG. 5 is a detail circuit of the current-spare switching control unit shown in FIG. 3. In FIG. 5, 51 denotes a RS-type flip-flop circuit corresponding to the register 31 of FIG. 3, 52 denotes a shift register corresponding to the shift register 32 of FIG. 3, and 53 denotes a decoder corresponding to the discrimination unit 33 of FIG. 3. The shift register 52 is constituted by D-type flip-flop circuits (52a to 52c).

As explained above, the shift command SC and the bits $D_1$ to $D_3$ are input from the internal microprocessor CPU of the fault supervisor 14 of FIG. 1. The bits D to D: are sequentially input to the terminal D of the flip-flop circuit 52a. Each output of the flip-flop circuit 52a to 52c is input to the decoder 53. The decoder 53 decodes the bits $D_1$ to $D_3$ so that outputs bits "10" or "01" to the flip-flop circuit 51 produce the switching signal S.

We claim:

1. A current-spare switching control system provided for a data processing system having a current data processor, a spare data processor, a fault supervisor for supervising the fault of these processors, and switching units for switching from the current data processor to the spare data processor or vice versa, said current-spare switching control system comprising:

storage means (22) for temporarily storing data bits ($D_1$ to $D_3$) from the fault supervisor (14);

discrimination means (23) operatively connected to the storage means for comparing the data bits with a reference signal (REF) and outputting a coincidence signal (C) when the data bits coincide with the reference signal;

an AND gate (24) operatively connected to the discrimination means for inputting the coincidence signal and a write command (CS1) from the fault supervisor, and outputting a write signal (W) when the coincidence signal coincides with the write command; and register means (21) operatively connected to the AND gate for inputting a data bit ($D_0$) from the fault supervisor and outputting a switching signal (S) to switch from the current data processor to the spare data processor or vice versa.

2. A current-spare switching control system as claimed in claim 1, wherein: said storage means comprises D-type flip-flop circuits (42a to 42c) each corresponding to each of data bits ($D_1$ to $D_3$) and inputting a write command (CS2) from the fault supervisor; and the register means comprises a D-type flip-flop circuit (41) for inputting the data bit ($D_0$) from the fault supervisor and the write signal (W) from the AND gate, and outputting the switching signal (S).

3. A current-spare switching control system as claimed in claim 2 further comprising a leading edge detection circuit (45) operatively connected to the D-type flip-flop circuit (41) and the AND gate (44), for inputting the write signal (W) from the AND gate, detecting a leading edge of the write signal, and outputting a reset signal (RE) to the flip-flop circuits (42a to 42c) to clear the data bits therein.

4. A current-spare switching control system provided for a data processing system having a current data processor, a spare data processor, a fault supervisor for supervising the fault of these processors, and switching units for switching from the current data processor to the spare data processor or vice versa, said current-spare switching control system comprising:

shift register means (32) for sequentially inputting data bits ($D_1$ to $D_3$) from the fault supervisor (14) and outputting data bits parallel therefrom in response to a shift command (SC) from the fault supervisor;

discrimination means (33) operatively connected to the shift register means for comparing the data bits with a reference signal (REF) and outputting a coincidence signal (C) when the data bits coincide with the reference signal; and register means (31) operatively connected to the discrimination unit for outputting a switching signal (S) to switch from the current data processor to the spare data processor or vice versa.

5. A current-spare switching control system as claimed in claim 4, wherein: said shift register means comprises D-type flip-flop circuits (52a to 52c), a first flip-flop circuit (52a) sequentially inputting data bits ($D_1$ to $D_3$), and each flip-flop circuit (52a to 52c) outputting data bits in parallel in response to the shift command; and said discrimination means comprises a decoder for decoding data bits to produce the switching signal (S).

6. A method for generating a current-spare switching signal provided for a data processing system having a current data processor, a spare data processor, a fault supervisor for supervising the fault of these processors, and switching units for switching from the current data processor to the spare data processor or vice versa, said method comprising the steps of:

temporarily storing data bits ($D_1$ to $D_3$) from the fault supervisor (14);

comparing the data bits with a reference signal (REF) and outputting a coincidence signal (C) when the data bits coincide with the reference signal;

generating a write signal (W) when the coincidence signal coincides with a write command (CS1) from the fault supervisor; and outputting a current-spare switching signal (S) to switch from the current data processor to the spare data processor or vice versa, based on the data bit ($D_0$) from the fault supervisor.

* * * * *